United States Patent
Kumaraswamy et al.

(10) Patent No.: US 11,267,365 B2
(45) Date of Patent: Mar. 8, 2022

(54) PROACTIVE THERMAL CONDITIONING SYSTEM AND METHOD

(71) Applicant: GM GLOBAL TECHNOLOGY OPERATIONS LLC, Detroit, MI (US)

(72) Inventors: Samanth Kumaraswamy, Walled Lake, MI (US); Charles M. Tomlinson, Southfiled, MI (US); Brinton Mooberry, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 16/559,779

(22) Filed: Sep. 4, 2019

(65) Prior Publication Data

US 2021/0061130 A1    Mar. 4, 2021

(51) Int. Cl.
| | |
|---|---|
| B60L 58/26 | (2019.01) |
| H01M 10/613 | (2014.01) |
| H01M 10/625 | (2014.01) |
| H01M 10/633 | (2014.01) |
| H01M 10/6552 | (2014.01) |

(52) U.S. Cl.
CPC .......... B60L 58/26 (2019.02); H01M 10/613 (2015.04); H01M 10/625 (2015.04); H01M 10/633 (2015.04); H01M 10/6552 (2015.04); B60L 2240/36 (2013.01); B60L 2240/545 (2013.01); B60L 2240/549 (2013.01); H01M 2220/20 (2013.01)

(58) Field of Classification Search
CPC ......... H01M 2220/00; H01M 2220/20; H01M 10/00; H01M 10/613; H01M 10/625; H01M 10/633; H01M 10/6552; B60L 2240/00; B60L 2240/36; B60L 2240/545; B60L 2240/549; B60L 58/00; B60L 58/26; B60L 58/10; B60L 58/12; B60L 58/24; B60L 58/25; B60L 58/32; B60L 58/33; B60L 58/40; Y10S 236/00; B60W 2710/28; B60W 2710/285; B60W 2510/24; B60W 2510/246; B60W 2510/285; G05B 2219/49215; G05D 23/00; G05D 23/1951
USPC .......................................................... 701/22
See application file for complete search history.

(56) References Cited

U.S. PATENT DOCUMENTS

| | | | |
|---|---|---|---|
| 4,814,240 A | * | 3/1989 | Zaromb ................ B60L 50/64 429/422 |
| 8,589,024 B2 | | 11/2013 | Buford et al. |
| 8,600,598 B2 | | 12/2013 | Simonini et al. |
| 8,781,658 B2 | | 7/2014 | Simonini |

(Continued)

OTHER PUBLICATIONS

Ota, Yutaka et al. (Jul. 6-11, 2008). Modelling of Voltage Hysteresis and Relaxation of HEV NiMH Battery. Proceedings of the 17th World Congress—The International Federation of Automatic Control. Seoul, Korea.

*Primary Examiner* — Anthony R Jimenez
(74) *Attorney, Agent, or Firm* — Lorenz & Kopf LLP

(57) ABSTRACT

Systems and methods are provided for active cooling of a rechargeable energy storage system. A thermal conditioning system includes a cooling system configured to circulate a coolant to cool the RESS. A controller computes a generated heat amount of the RESS; computes a target temperature of the coolant based on the generated heat amount; and operates actuators of the thermal conditioning system to cool the coolant to the target temperature.

20 Claims, 6 Drawing Sheets

(56) References Cited

U.S. PATENT DOCUMENTS

| | | | |
|---|---|---|---|
| 10,481,623 B1* | 11/2019 | Forouzan | H01M 10/66 |
| 2013/0289812 A1* | 10/2013 | Anzicek | B60L 58/10 |
| | | | 701/22 |
| 2018/0059190 A1 | 3/2018 | Verbrugge et al. | |
| 2020/0317087 A1* | 10/2020 | Brinkmann | H01M 10/625 |

* cited by examiner

PROACTIVE THERMAL CONDITIONING SYSTEM AND METHOD

TECHNICAL FIELD

The present disclosure generally relates to rechargeable energy storage systems and more specifically, to methods and systems for proactive thermal conditioning of rechargeable energy storage systems of vehicles.

BACKGROUND

A rechargeable energy storage system (RESS), such as those that use batteries and/or other storage devices are in widespread use as electric power sources. In a number of RESS applications, heat generation has an effect on the capacity, performance and life of the batteries. In general, higher current flows result in greater heat generation. In applications such as electric vehicles, the system reaches high current levels during fast charging and when generating sufficient torque to accelerate the vehicle. Conventional cooling techniques rely on passive or forced convection to air, or on circulation of fluid through the battery pack. A common approach allows generated heat to build prior to initiating a cooling cycle, which leads to high peak-to-peak temperature excursions. Another approach is to circulate the air or fluid at rates that provide cooling in excess of the rate of heat generation under many typical operating conditions. These approaches lead to inefficiencies, including in operation of the cooling system itself.

Accordingly, it is desirable to provide improved methods for thermal cooling of a RESS, for example to improve energy efficiency and improve battery performance. It is also desirable to provide improved systems for thermal cooling of a RESS, and for vehicles that include such methods and systems. Furthermore, other desirable features and characteristics of the present invention will become apparent from the subsequent detailed description and the appended claims, taken in conjunction with the accompanying drawings and the foregoing technical field and background.

SUMMARY

Systems and methods are disclosed for active cooling of a RESS. In a number of embodiments, a thermal conditioning system includes a cooling system configured to circulate a coolant to cool the RESS. A controller computes the amount of heat generated by the RESS; computes a target temperature of the coolant based on the generated heat amount; and operates actuators of the thermal conditioning system to cool the coolant to the target temperature.

In additional embodiments, the controller is configured to compute the generated heat amount based on ohmic losses, anode and cathode interface losses and diffusion losses, of the RESS.

In additional embodiments, herein the controller is configured to compute the generated heat amount using: generated heat amount=$I^2R_{ohm}+V_{dl1}^2/R_{ct1}+V_{dl2}^2/R_{ct2}+IV_{diff}$, where, I is current through the RESS; $R_{ohm}$ is ohmic resistance of the RESS; $V_{dl1}$ is double layer voltage of an anode interface of the RESS; $V_{dl2}$ is double layer voltage of a cathode interface of the RESS; $R_{ct1}$ is charge transfer resistance of the anode interface; $R_{ct2}$ is charge transfer resistance of the cathode interface; and $V_{diff}$ is diffusion voltage of the RESS.

In additional embodiments, the controller sums the computed generated heat amount over a time t to obtain a total generated heat amount, and computes the target temperature of the coolant to remove the total generated heat amount from the coolant during a next time that is equal to the time t.

In additional embodiments, the controller computes a temperature difference (dT) of the coolant, wherein the dT is an amount determined to remove, by the coolant, the generated heat amount from the RESS.

In additional embodiments, the temperature difference is computed using: $dT=Q/mC_p$, where, Q is a total heat generated by the RESS; m is a mass flow rate of the coolant; and $C_p$ is a value representing thermal capacity of the coolant.

In additional embodiments, the controller includes a PID module configured to issue a command when the coolant temperature, as communicated through a feedback loop diverges from a setpoint. The controller includes a feedforward module configured to monitor heat generation in the RESS to predict an impact on the coolant temperature, prior to the impact being registered through the feedback loop.

In additional embodiments, the controller controls the coolant to a setpoint temperature; and initiates cooling of the RESS based on the generated heat amount and before the coolant reaches the setpoint temperature.

In additional embodiments, the cooling system includes a fluid circuit with a coolant loop through which the coolant is circulated. A refrigerant circuit is configured to circulate a refrigerant. Both the coolant and refrigerant are circulated through a heat exchanger.

In additional embodiments, the controller computes the generated heat amount using current, ohmic resistance, charge transfer resistances and diffusion resistance of the RESS.

In a number of additional embodiments, a method of thermal conditioning a RESS includes circulating a coolant through a cooling system to cool the RESS. A controller computes a generated heat amount of the RESS. A target temperature of the coolant is computed based on the generated heat amount. The controller operates actuators of the thermal conditioning system to cool the coolant to the target temperature.

In additional embodiments, the generated heat amount is computed using: generated heat amount=$I^2R_{ohm}+V_{dl1}^2/R_{ct1}+V_{dl2}^2/R_{ct2}+IV_{diff}$, where, I is current through the RESS; $R_{ohm}$ is ohmic resistance of the RESS; $V_{dl1}$ is double layer voltage of an anode interface of the RESS; $V_{dl1}$ is double layer voltage of a cathode interface of the RESS; $R_{ct1}$ is charge transfer resistance of the anode interface; $R_{ct2}$ is charge transfer resistance of the cathode interface; and $V_{diff}$ is diffusion voltage of the RESS.

In additional embodiments, the controller sums the computed generated heat amount over a time t to obtain a total generated heat amount. The target temperature of the coolant is computed to remove the total generated heat amount from the coolant during a next time that is equal to the time t.

In additional embodiments, the controller computes a temperature difference (dT) of the coolant, wherein the dT is an amount determined, by the controller, to remove the generated heat amount from the RESS.

In additional embodiments, the temperature difference is computed by solving $dT=Q/mC_p$, where, Q is a total heat generated by the RESS; m is a mass flow rate of the coolant; and $C_p$ is a value representing thermal capacity of the coolant.

In additional embodiments, the coolant temperature is communicated through a feedback loop. A PID module of the controller issues a command to cool the coolant when the coolant temperature diverges from a setpoint. A feedforward module monitors heat generation in the RESS to predict an impact on the coolant temperature, prior to the impact being registered through the feedback loop.

In additional embodiments, the coolant is controlled to a setpoint temperature. Cooling of the RESS is initiated based on the generated heat amount and before the coolant reaches the setpoint temperature.

In additional embodiments, the generated heat amount includes ohmic losses, anode interface losses, cathode interface losses, and voltage diffusion losses of the RESS.

In additional embodiments, the generated heat amount is computed using current, ohmic resistance, charge transfer resistances and diffusion resistance inputs from the RESS.

In a number of additional embodiments, a vehicle includes an electric powertrain and a coupled RESS. A thermal conditioning system includes a fluid circuit that includes a coolant loop configured to circulate the coolant, including through the RESS, and includes a refrigerant circuit configured to circulate a refrigerant. Both the coolant and refrigerant are circulated through a heat exchanger. A controller is coupled with the RESS and with the cooling system and computes a generated heat amount of the RESS. The computed generated heat amount is summed over a time t to obtain a total generated heat amount. The target temperature of the coolant is computed to remove the total generated heat amount from the coolant during a next time that is equal to the time t. Actuators of the thermal conditioning system are operated to cool the coolant through the heat exchanger to the target temperature over the time t.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
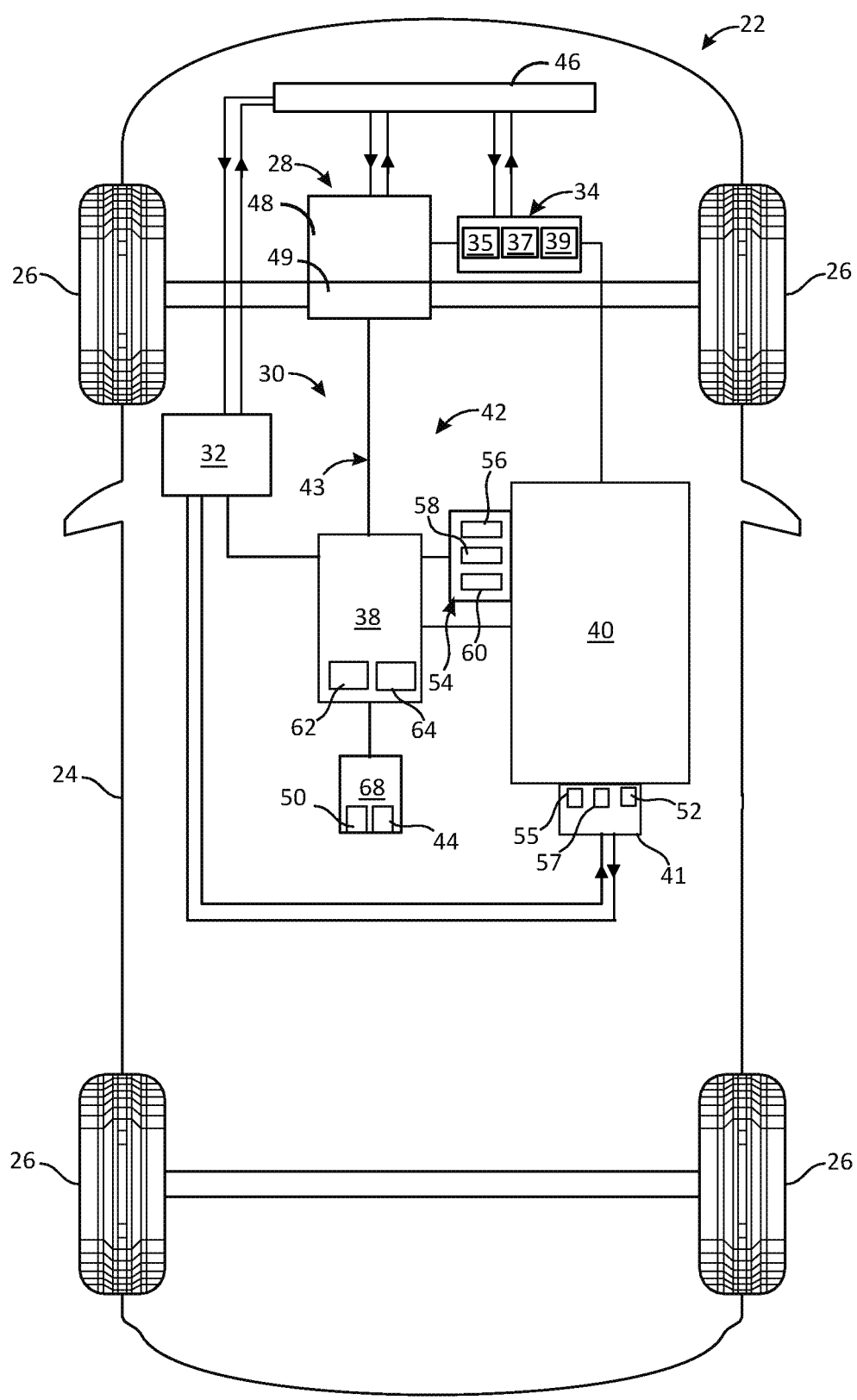
FIG. 1 is a functional block diagram of a vehicle that includes a RESS and a control system for thermally cooling the RESS, in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit, an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of flow systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The current disclosure provides systems and methods to accurately determine cooling requirements of a RESS and control various actuators associated with the RESS to set a coolant temperature. As disclosed herein, systems and methods compute a generated heat amount of the RESS. A target temperature of the coolant is determined based on the generated heat amount. Actuators of the thermal conditioning system are operated to cool the coolant to the target temperature to remove the generated heat amount from the RESS. Feedforward control may be used to determine the generated heat amount and proactively reduce the coolant temperature prior to registry of an increased coolant temperature above a setpoint. By incrementally removing heat as it is generated, the systems and methods improve cooling efficiency. As a result, less energy is used for thermal conditioning, reserving more for uses such as vehicle propulsion.

Referring to FIG. 1, a vehicle 22 is illustrated having a RESS 40 according to an exemplary embodiment. As described in greater detail below, the vehicle 22 includes control approaches that initiate cooling in response to characteristics of the heat generated by the RESS 40. In a number of embodiments, the vehicle 22 generally includes a body 24, four wheels 26, a powertrain 28, a powertrain control system 30, the RESS 40, and a RESS control system 42. The body 24 substantially encloses the other components of the vehicle 22. The wheels 26 are each rotationally coupled to the body 24 near a respective corner. In some embodiments the RESS control system 42 may be integrated with the powertrain control system 30.

The vehicle 22 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 22 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment, the vehicle 22 is an electric vehicle, and generally includes a controller 38, the above-referenced RESS 40, the RESS control system 42, the powertrain 28, power electronics 34 and a powertrain control system 30. The powertrain 28 embodies an electric propulsion system that drives the wheels 26. More specifically, the powertrain includes an electric motor 48. As will be appreciated by one skilled in the art, the electric motor 48 is associated with a transmission 49 as an integral or separate component, and, although not illustrated, also includes a stator assembly (including conductive coils), a rotor assembly (including a ferromagnetic core), and a cooling fluid or coolant. The power electronics 34 may include electric vehicle elements such as a power inverter module 35, an accessory power module 37 and an onboard charger module 39.

The RESS 40 is mounted on the body 24, and is electrically connected to the power electronics 34. In the current embodiment, the RESS 40 comprises at least one rechargeable battery having a pack of battery cells. In other embodiments the RESS 40 comprises another type of electrical energy storage device. Together, the RESS 40 and the powertrain 28 comprise a drive system to propel the vehicle 22. The RESS 40 is thermally conditioned including being thermally cooled as described in more detail below.

The vehicle 22 includes at least one heat exchanger 46 in the form of a radiator and/or a condenser. The heat exchanger 46 may be used to cool the powertrain 28 and in some embodiments, the power electronics 34. The heat exchanger 46 may also be used by a heating, ventilating, and air conditioning (HVAC) system 32 for cabin conditioning of the vehicle 22, such as for heating and cooling. For example, the HVAC system 32 may use warm coolant, such as from a radiator loop, for heating. In addition, the HVAC system may use a compressed refrigerant circulated through a condenser, for cooling. In some embodiments, the HVAC system 32 may also be coupled with a thermal conditioning system 41. In these embodiments, the HVAC system 32 circulates a refrigerant for cabin cooling purposes, which may also be used by the thermal conditioning system 41 for cooling the RESS 40. In other embodiments, the thermal conditioning system 41 may be separate from the HVAC system 32.

In general, the thermal conditioning system 41 includes a pump 52 and a sensor array 54, and may be controlled by the RESS control system 42. In a number of embodiments, the thermal conditioning system 41 includes a compressor 55 and a valve array 57 for controlling fluids flows. In addition, although not illustrated as such, the RESS control system 42 (and/or one or more components thereof) may be separately housed from the powertrain control system 30 and may also include one or more power sources and/or controllers. The thermal conditioning system 41 thermally conditions the RESS 40. Specifically, the thermal conditioning system 41 may utilize heating and cooling techniques, as appropriate, for heating or cooling the RESS 40, based on instructions provided by the controller 38, such as by the processor 62. The heating and cooling techniques are selected so as to attain the desired a desired temperature of the RESS 40 while optimizing energy efficiency.

The sensor array 54 includes one or more ambient temperature sensors 56, one or more RESS sensors 58, and one or more thermal conditioning system sensors 60, among other various additional sensors. The ambient temperature sensors 56 are preferably disposed proximate the RESS 40. The ambient temperature sensors 56 measure an ambient temperature outside (and preferably adjacent to) the RESS 40. The ambient temperature sensors 56 provide signals and/or information pertaining to the measurements to the controller 38 for processing and for use in thermally conditioning the RESS 40. The RESS sensors 58 are also preferably disposed proximate the RESS 40. The RESS sensors 58 measure one or more values (including a resistance, a voltage and/or a current of, or values for use in determining a resistance, a voltage and/or a current of) the RESS 40. The RESS sensors 58 provide signals and/or information pertaining to the measurements to the controller 38 for processing and for use in thermally conditioning the RESS 40. The thermal conditioning system sensors 60 are preferably disposed within or proximate to the thermal conditioning system 41. The thermal conditioning system sensors 60 measure one or more values, such as temperature, for use by the thermal conditioning system 41 for thermally conditioning the RESS 40 based on instructions provided by the controller 38.

The controller 38 is coupled to the powertrain 28, the power electronics 34 the sensor array 54, the RESS 40, and the HVAC system 32. As will be appreciated, the controller 38 may be coupled to a number of other devices and systems. The controller 38 utilizes data and information and the measured values from the sensor array 54 in thermally conditioning the RESS 40 via the thermal conditioning system 41 in a manner that optimizes energy efficiency. In a preferred embodiment, the controller 38 performs these functions in accordance with steps of the process 500 described further below in connection with FIG. 5. In general, the controller 38 is coupled with a communication system, such as a bus 43. Additionally, one or more network communications protocols such as CAN or Flexray communication may be used by the communication system to interface between the various control modules in the vehicle 22. The bus 43 serves to transmit programs, data, status and other information or signals between the various components of the computer system of the controller 38. The bus 43 may be any suitable physical or logical means of connecting computer systems and components. This includes, but is not limited to, direct hard-wired connections, fiber optics, infrared and wireless bus technologies.

As depicted in FIG. 1, the controller 38 comprises a computer system. Generally, the controller 38 is configured to receive inputs from various sensors which are configured to generate signals in proportion to various physical input parameters associated with the powertrain 28, the HVAC system 32, and the RESS 40, their subsystems, and other interrelated systems. It will be appreciated that operation of the powertrain 28 and the RESS 40 is closely related and overlapping.

In the depicted embodiment, the controller 38 includes a processor 62 and a memory device 64, and is coupled with a storage device 68. The processor 62 performs the computation and control functions of the controller 38, and may comprise any type of processor or multiple processors, single integrated circuits such as a microprocessor, or any suitable number of integrated circuit devices and/or circuit boards working in cooperation to accomplish the functions of a processing unit. During operation, the processor 62 executes one or more programs 44 and may use data 50, each of which may be contained within the storage device 68 and as such, the processor 62 controls the general operation of the controller 38 in executing the processes described herein, such as the processes described further below in connection with FIG. 5.

The memory device 64 may be any type of suitable memory. For example, the memory device 64 may include volatile and nonvolatile storage in read-only memory (ROM), random-access memory (RAM), and keep-alive memory (KAM), for example. KAM may comprise a persistent or non-volatile memory that may be used to store various operating variables while the processor 62 is powered down. The memory device 64 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 38. In certain embodiments, the memory device 64 may be located on and/or co-located on the same computer chip as the processor 62. In the depicted embodiment, the memory device 64 may store the above-referenced programs along with one or more stored values of the data 50 such as for short-term data access.

The storage device 68 stores data, such as for long-term data access for use in automatically operating the powertrain control system 30, the RESS control system 42 and related systems. The storage device 68 may be any suitable type of storage apparatus, including direct access storage devices such as hard disk drives, flash systems, floppy disk drives and optical disk drives. In one exemplary embodiment, the storage device 68 comprises a source from which the memory device 64 receives the programs that execute one or more embodiments of one or more processes of the present disclosure, such as the steps of the process (and any sub-processes thereof) described further below in connection with FIG. 5. In another exemplary embodiment, the programs 44 may be directly stored in and/or otherwise accessed by the memory device 64.

The programs 44 represent executable instructions, used by the electronic controller 38 in processing information and in controlling the powertrain 28, the RESS 40 and their systems. The instructions may include one or more separate programs, each of which comprises an ordered listing of executable instructions for implementing logical functions. The instructions, when executed by the processor 62 support the receipt and processing of signals such as from the various sensors, and the performance of logic, calculations, methods and/or algorithms for automatically controlling the components and systems of the powertrain 28 and the RESS 40. The processor 62 may generate control signals to automatically control various components and systems of the powertrain 28 and the RESS 40, including the thermal conditioning system 41 based on the logic, calculations, methods, and/or algorithms.

As will be appreciated, the data storage device 68 may be part of the controller 38, separate from the controller 38, part of one or more other controllers, or part of multiple systems. The memory device 64 and the storage device 68 work together with the processor 62 to access and use the programs 44 and the data 50. While the components of the powertrain control system 30 and RESS control system 42 are depicted as being part of the same system, it will be appreciated that in certain embodiments, these features may comprise multiple systems. In addition, in various embodiments the powertrain control system 30 and RESS control system 42 may comprise all or part of, and/or may be coupled to, various other vehicle devices and systems.

The powertrain control system 30 and the RESS control system 42 control operation of the powertrain 28 and the RESS 40 to deliver the desired operational performance. In general, the controller 38 uses the available inputs, including those from the various sensors, actuators and systems identified herein, to the provide powertrain control system 30 and the RESS control system 42 with parameter data to effectively govern various functions of the powertrain 28 and the RESS 40. For example, based on the data input, the controller 38 precisely calculates and controls operation of the thermal conditioning system 41 and the HVAC system 32.

Figure 2:
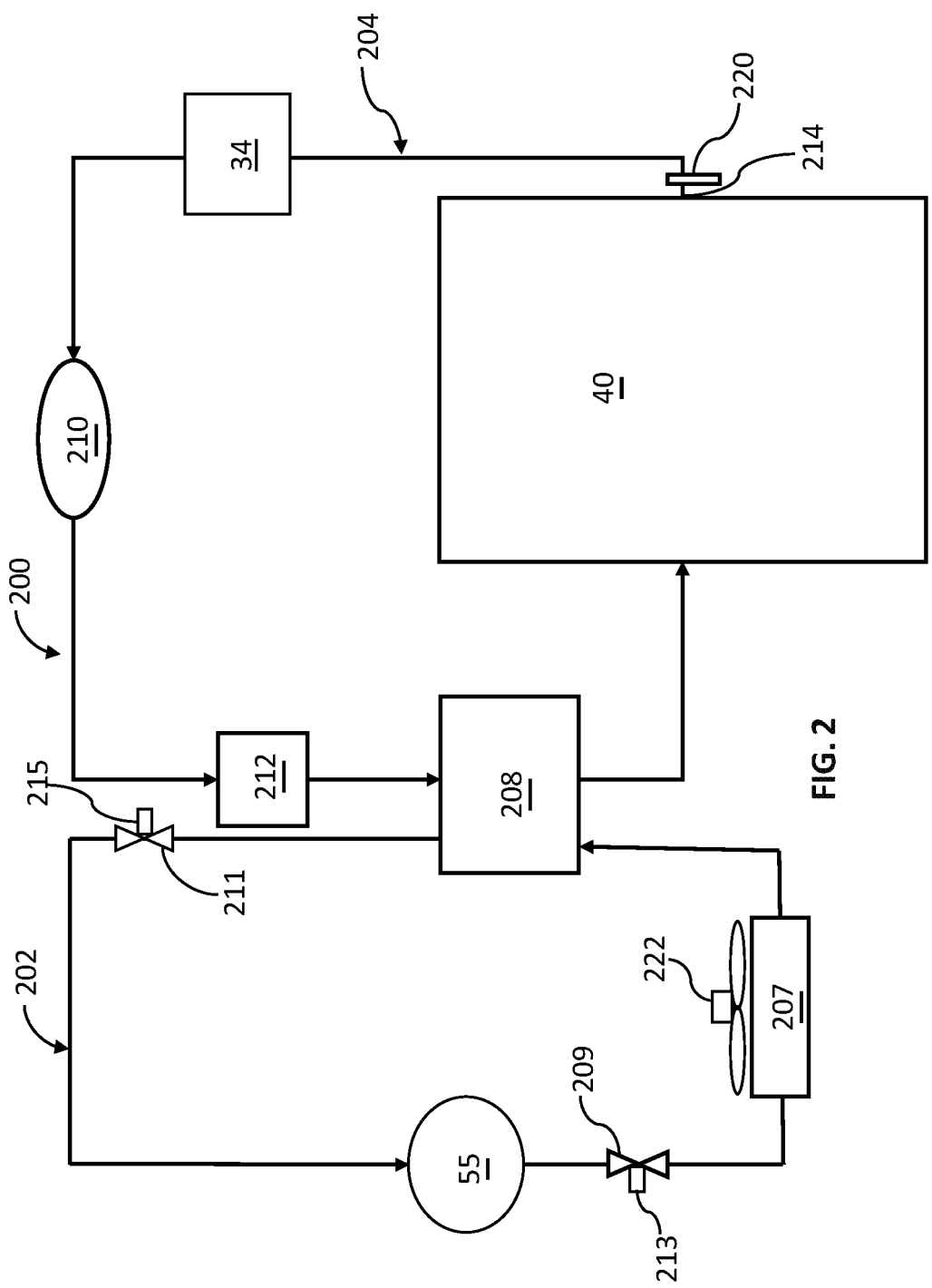
FIG. 2 is a schematic view of a thermal cooling system for use with the vehicle of FIG. 1, in accordance with an exemplary embodiment.

Referring to FIG. 2, a cooling system 200 of the thermal conditioning system 41 is illustrated in schematic form. The cooling system 200 generally includes a refrigerant loop 202 configured to circulate a refrigerant and a coolant loop 204 configured to circulate a coolant fluid. In this embodiment, the refrigerant loop 202 generally includes the compressor 55, a condenser 207, and two valves 209, 211. The valves 209, 211 are flow control valves and may be a part of the valve array 57 controlled by the controller 38. In other embodiments, the refrigerant loop 202 may be part of a system that may also deliver refrigerant for other uses, such in the HVAC system 32 for passenger compartment cooling. The refrigerant loop 202 and the coolant loop 204 both circulate their respective fluids through a heat exchanger 208, within which the fluids are segregated. The heat exchanger 208 operates an evaporator for the refrigerant loop 202 and is configured to conduct heat from the coolant to the refrigerant and thereby to reduce the temperature of the coolant in the coolant loop 206. The coolant loop 204 includes a pump 210 for circulating the coolant through the heat exchanger 208 and the RESS 40. In some embodiments, the coolant loop runs through the power electronics 34, for cooling thereof. The coolant loop 204 may also include a heater 212 for warming the coolant during certain operating conditions, such as during cold weather.

One of the thermal conditioning system sensors 60, in this case embodied as a temperature sensor 220, is disposed in the coolant loop 204 adjacent a downstream junction 214 with the RESS 40 for monitoring and reporting the temperature of the coolant exiting the RESS 40. The cooling system 200 cools the RESS 40 by collecting heat from the RESS 40 in the circulated coolant and transferring that heat to the refrigerant within the heat exchanger 208. The direction of coolant flow through the heat exchanger 208 may be counter to that of the refrigerant to maximize heat transfer between the two.

The rate of heat collection from the RESS 40 by the coolant is a function of the coolant flow rate, and of the temperature of the coolant entering the RESS 40. The temperature of the coolant entering the RESS 40 is a function of the coolant and refrigerant flow rates, and the temperatures of the coolant and refrigerant entering the heat exchanger. A fan 222 is disposed proximate the condenser 207 to produce air flow over the condenser to remove heat from the refrigerant. To control the coolant temperature, speed of the compressor 55 may be varied to change the refrigerant flow rate; speed of the pump may be varied to change the coolant flow rate; positions of the valves 209, 211 may be varied by operating their respective actuators 213, 215; and/or speed of the fan may be varied to change heat transfer from the refrigerant. Accordingly, the actuators available to change the temperature of the coolant in the coolant loop 204 include the pump 210, the compressor 55, the fan 222, and the valve actuators 213, 215. For example, the temperature of the coolant entering the RESS 40 may be lowered by increasing speed of the compressor 55 increasing flow rate of the refrigerant circulating through the heat exchanger 208.

Figure 3:
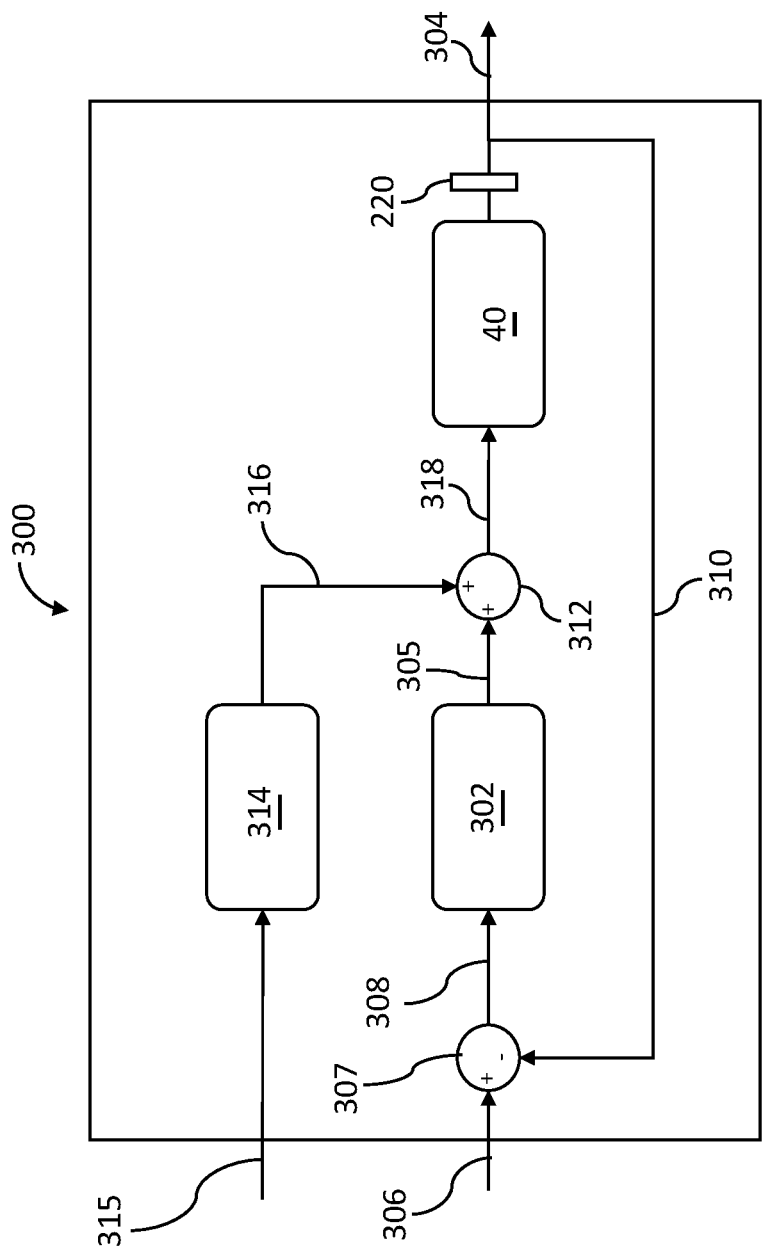
FIG. 3 is a schematic view of a thermal cooling control system of FIG. 1, in accordance with an exemplary embodiment.

In a number of embodiments, the thermal conditioning system 41 uses a controller 300 as depicted in FIG. 3. The operations of the controller 300 may be carried out by the controller 38 or may be embodied in different hardware. The controller 300 is configured to control the coolant temperature 304 exiting the RESS 40 as monitored by a temperature sensor 220 at the downstream junction 214. The temperature sensor 220 may be one of the thermal conditioning system sensors 60. A proportional integral derivative (PID) module 302 is configured to issue a command 305 when the coolant temperature 304, as communicated through the feedback loop 310, moves from a setpoint 306 to produce an error 308 (setpoint 306—coolant temperature 304). Accordingly, the PID module 302 only begins to respond after the coolant temperature 304 has deviated from the setpoint 306 by the error 308. In other embodiments another module such as a PI controller based module may be used. With feedback control only, high peak-to-peak variation in the coolant temperature 304 over a drive cycle may result. This may lead to an inefficient amount of energy being used to cool the RESS 40 as the thermal conditioning system 41 works to overcome the temperature fluctuations.

A feedforward module 314 is included to monitor heat generation (generated heat amount) in the RESS 40, which is used to predict an impact on the coolant temperature 304 exiting the RESS 40, before the temperature sensor 303 is able to measure a resulting temperature increase. The feedforward module 314 receives inputs 315, such as from the RESS sensors 58, including for example, current, voltage and resistance across the RESS 40. The feedforward module 314 computes a generated heat amount as a prediction of an upcoming temperature increase and initiates preemptive control to counteract the predicted increase. Based on the computed generated heat amount, the feedforward module 314 issues a command 316 that alone or in addition to the command 305 from the PID module 302 determines a commanded coolant temperature 318 to cool the RESS 40 and maintain the coolant temperature 304 close to the setpoint 306.

Figure 4:
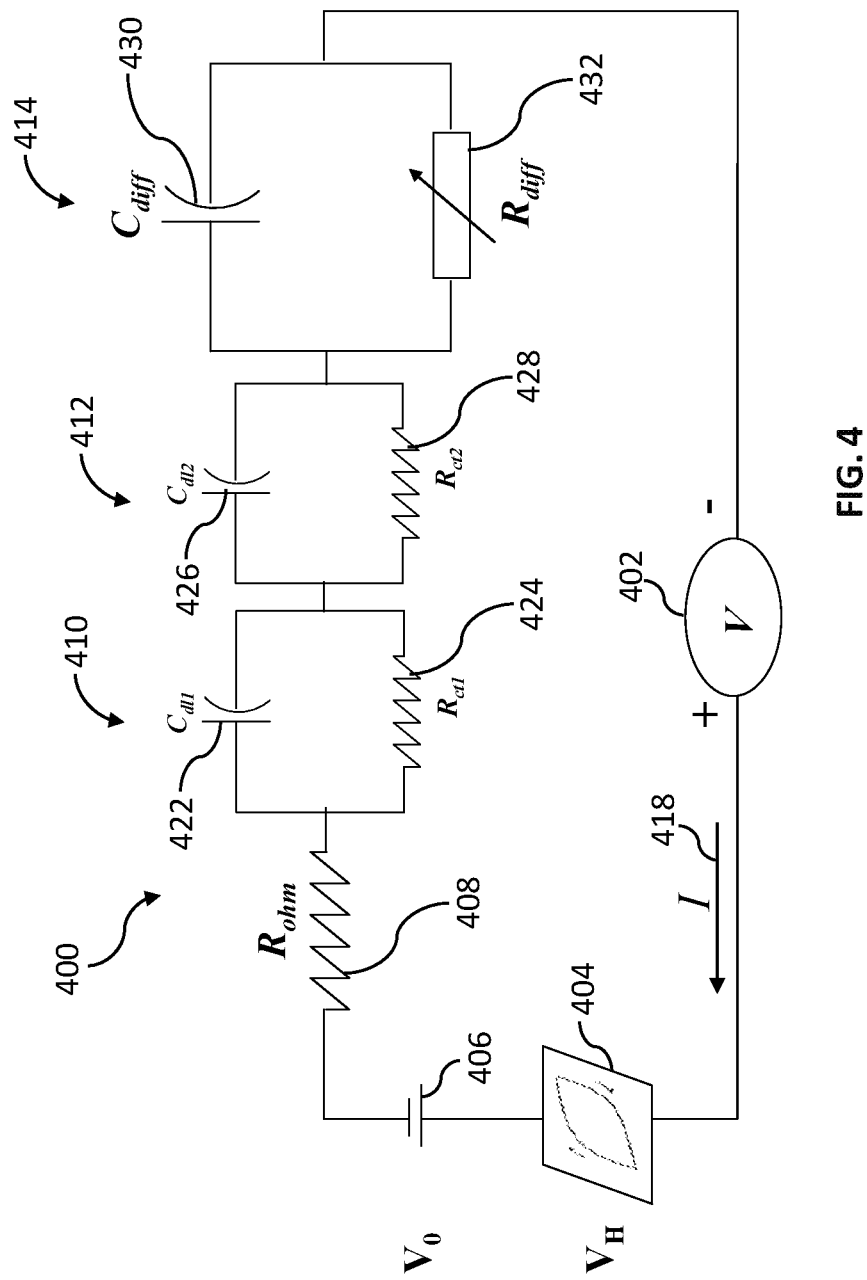
FIG. 4 is a schematic view of a battery model for the thermal cooling control system of FIG. 3, in accordance with an exemplary embodiment.

Referring to FIG. 4, the RESS 40 is shown in RC model form, for example an equivalent circuit model 400 with parallel RC pairs connected in series. The parallel RC network in series may be used to describe the dynamic characteristics of the RESS 40. The equivalent circuit model 400 may be used to estimate the generated heat amount in the RESS 40. The terminal voltage (V) 402 is the sum of the hysteresis voltage ($V_H$) 404, the open-circuit voltage ($V_{oc}$) 406, voltage ($V_{IR}$) to overcome the ohmic resistance ($R_{ohm}$) 408, voltage ($V_{dl1}$) across the RC pair 410 for the anode interface, voltage ($V_{dl2}$) across the RC pair 412 for the cathode interface, and voltage ($V_{diff}$) across the bulk diffusion term 414. The RC pair 410 for the anode interface comprises a double layer capacitance ($C_{dl1}$) 422 and a charge transfer resistance ($K_{ct1}$) 424. The RC pair 412 for the cathode interface comprises a double layer capacitance ($C_{dl2}$) 426 and a charge transfer resistance ($R_{ct2}$) 428. The bulk diffusion term 414 comprises a diffusion capacitance ($C_{diff}$) 430 and a diffusion resistance ($R_{diff}$) 432. In equation form, the terminal voltage 402 of the RESS 40 may be expressed as: $V=V_H+V_O+IR_{ohm}+V_{dl1}+V_{dl2}+V_{diff}$. Components of the equivalent circuit model 400 may be used in the controller 300 to estimate the generated heat amount of the RESS 40. The components of the computed generated heat amount include ohmic losses: $I^2R_{ohm}$; losses at the anode and cathode interfaces: $V_{dl1}^7/R_{ct1}+V_{dl2}^2/R_{ct2}$: and loss due to diffusion: $IV_{diff}$. Accordingly, the heat generated by the RESS 40 is determined by: generated heat amount=$I^2R_{ohm}+V_{dl1}^2/R_{ct1}+V_{dl2}^2/R_{ct2}+IV_{diff}$.

Figure 5:
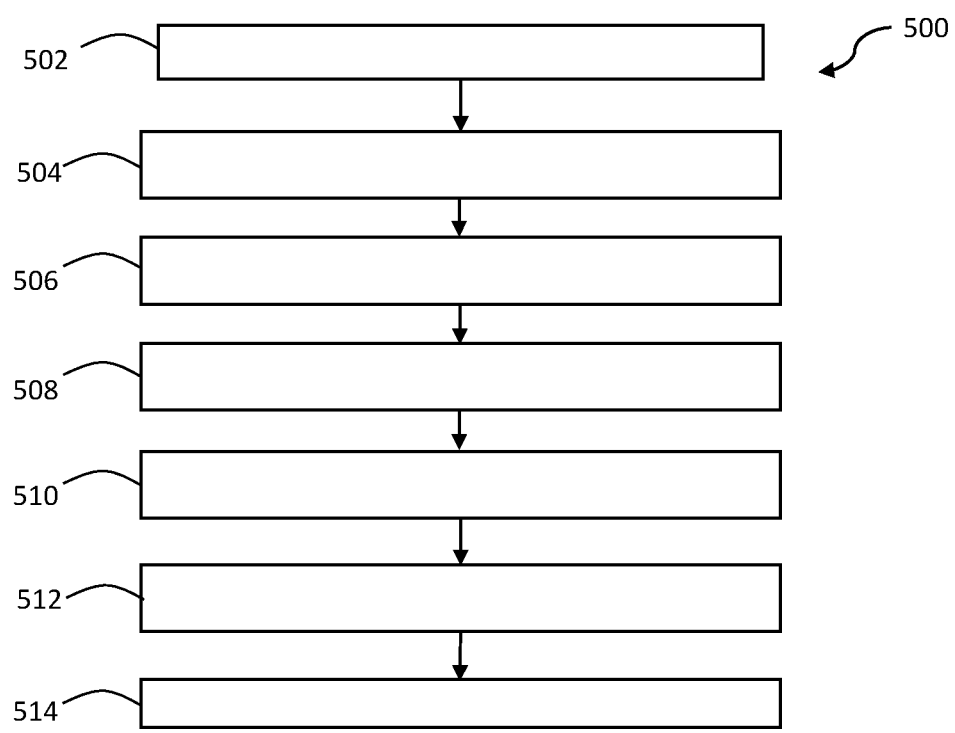
FIG. 5 is a flowchart of a process for actively cooling a RESS and that may be used in connection with the vehicle, the RESS, and the control system of FIG. 1, in accordance with an exemplary embodiment.

A process 500 for cooling the RESS 40 is illustrated in FIG. 5 in flowchart form. The process 500 begins with reading 502 the actuators, systems and temperatures. The monitored actuators may include the compressor 55 for which speed is monitored, the pump 210 for which speed is monitored, the fan 222, for which speed is monitored, and the actuators 213, 215 for which position is monitored and which reflects the position of the respective valves 209, 211. The monitored systems include the RESS 40 in which current, voltage and resistances are monitored, such as by the RESS sensors 58. The monitored sensors include those that sense temperatures including ambient temperature and coolant temperature, such as by the ambient temperature sensor 56 and the temperature sensor 220. The values that are read 502, may be sampled on a periodic basis, such as at every 100 milliseconds (ms) in the current embodiment.

The process 500 proceeds to compute 504 the generated heat amount of the RESS 40, during a preceding period. For example, after every reading 502, the calculation 504 reflects the heat generated during the preceding 100 ms. The calculation 504 by the controller 300 uses the equation: generated heat amount $I^2R_{ohm}+V_1^2/R_{ct1}+V_2^2/R_{ct2}+IV_{diff}$ as described above. In other embodiments, the generated heat amount may be computed by other approaches such as: generated heat amount=$\Delta VI$, where $\Delta V$ is the difference between $V_{oc}$ 403 and voltage derived from the state of charge (SOC) of the RESS 40 using a reverse lookup calibration table to select the present voltage $V_{soc}$. The difference may be multiplied by the current I (418) to obtain heat: generated heat amount=$I(V_{oc}-V_{soc})$.

Figure 6:
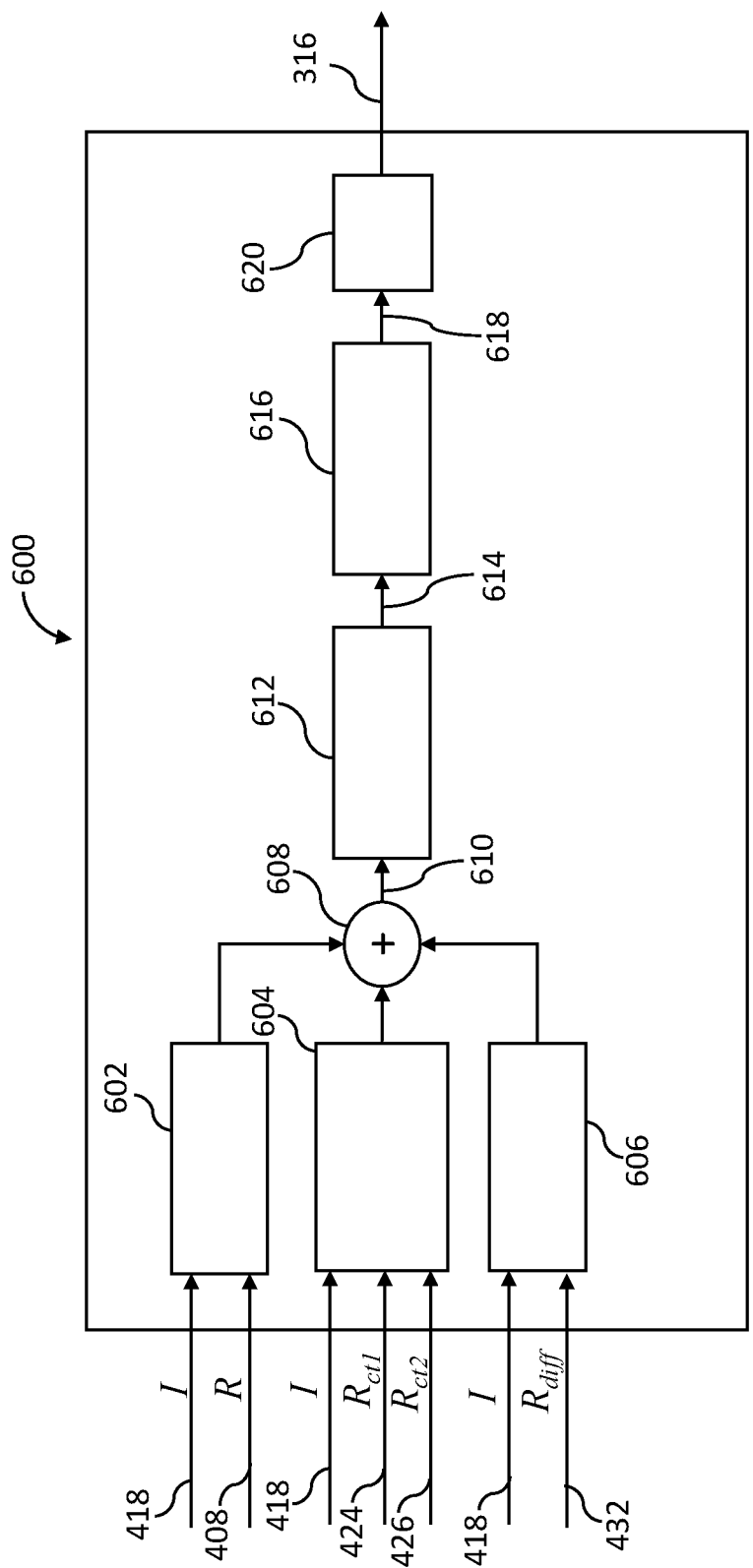
FIG. 6 is a diagram of part of the thermal cooling control system of FIG. 3, in accordance with an exemplary embodiment.

Referring additionally to FIG. 6, shown is a calculation module 600, which may be used to compute the generated heat amount of the RESS 40 over a given period of time t to obtain total generated heat amount over the period. In a number of embodiments, the calculation module 600 may reside in the feedforward module 314. The inputs to the calculation module 600 include the current I (418), the ohmic resistance $R_{ohm}$ (408), the charge transfer resistances $R_{ct1}$ (424) and $R_{ct2}$ (426), and the diffusion resistance $R_{diff}$ (432), all as monitored by the RESS sensors 58.

The current I (418) and the ohmic resistance $R_{ohm}$ (408) values are supplied to an ohmic loss submodule 602, which computes 504 the ohmic losses through the equation $I^2R_{ohm}$. The current I (418), the charge transfer resistance $R_{ct1}$ (424), and the charge transfer resistance $R_{ct2}$ (426) values are supplied to RC pairs loss submodule 604, which computes 504 the RC pair losses through the equation $V_{dl1}^2/R_{ct1}+V_{dl2}^2/R_{ct2}$. The voltage $V_{dl1}$ may be obtained by calculating I $R_{ct1}$ and the voltage $V_{dl2}$ may be obtained by calculating I $R_{ct1}$. The current I (418) and the diffusion resistance $R_{diff}$ (432) values are supplied to the diffusion voltage loss submodule 606, which computes 504 the losses due to diffusion voltage through the equation $IV_{diff}$.

The ohmic losses, the RC pair losses and the diffusion voltage losses are added 506 in the addition submodule 608 resulting in an instantaneous generated heat amount value 610 which is supplied to summation submodule 612. The calculations 504 of submodules 602, 604, 606 are repeatedly carried out at short intervals such as every 100 ms. The summation submodule 612 collects the added calculation results over a time window of t seconds. The selection of an amount of time for t is dependent on the characteristics of the system being monitored and the expected operating conditions. The amount of time for t may be any multiple of 100 ms. In a number of embodiments, the amount of time selected fort is short enough to maintain relatively continuous temperature of the RESS at a selected level or range where operation is most efficient. After time t has passed, the summation submodule 612 delivers a value of the total generated heat amount 614 by the RESS 40 over the t amount of time. The total generated heat amount 614 over t time is received by a temperature difference calculation submodule 616.

The temperature difference calculation submodule 616 computes 508 the temperature difference that is needed in the coolant to remove the total generated heat amount 614 by the RESS 40 over the next t seconds. The next t seconds comprise the period of time (the next time), that follows the period for which the calculations are carried out. By removing the total generated heat amount over the next t second time frame, the operation of the cooling system is efficient and the temperature of the RESS 40 remains constant. The temperature difference dT (618) is computed 508 using the equation $dT=Q/mC_p$, where Q is the total generated heat amount 614, m is the mass flow rate of the coolant, and $C_p$ is a physical property value representing the specific heat capacity of the coolant. The mass flow rate of the coolant may be derived from the speed of the pump 210, such as through a lookup table of the data 50. In other embodiments, the mass flow rate may be determined by other means such as through use of a mass flow rate sensor.

With the temperature difference dT (618) computed 508 by the temperature difference calculation submodule 616, the target temperature for the coolant is computed 510 by subtracting in a subtraction submodule 620, the temperature difference dT (618) from the coolant temperature as measured by the temperature sensor 220. The target temperature is the command 316 in the controller 300 of FIG. 3. The command 316 alone, or in addition to the command 305 from the PID module 302, determines 512 a commanded coolant temperature 318 to cool the RESS 40 and maintain the coolant temperature 304 close to the setpoint 306. The PID feedback control of FIG. 3 ensures that the coolant temperature is reduced when the actual temperature measured by the temperature sensor 220 deviates from the setpoint 306 by more than the error 308. For example, if heat transfer to the RESS occurs from other sources such as due to radiation or conduction from the environment, the PID module 302 receives corresponding feedback 310 and will initiate cooling.

The actuators of the cooling system 200 are operated 514 by the controller 38 to achieve the commanded coolant temperature 318. To control the coolant temperature, speed of the compressor 55 may be varied to change the refrigerant flow rate, the speed of the pump may be varied to change the coolant flow rate, the speed of the fan 222 may be changed to change the temperature of the refrigerant, and/or positions of the valves 209, 211 may be varied by operating their respective actuators 213, 215. By actively removing heat as it is generated by the RESS 40, temperature increases are avoided, and cooling energy expenditure is minimized.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A thermal conditioning system for a rechargeable energy storage system (RESS), the thermal conditioning system comprising:
   a cooling system configured to circulate a coolant to cool the RESS; and
   a controller coupled with the cooling system and configured to, by a processor:
      compute a generated heat amount of the RESS over a time period;
      compute a target temperature of the coolant based on the generated heat amount, the target temperature targeted to remove the generated heat amount from the RESS over a next period of time, the next period of time approximately equal to the time period in duration, and the next period of time following the time period in sequence; and
      operate actuators of the thermal conditioning system to set the coolant at the target temperature to remove the generated heat amount from the RESS over the next period of time.

2. The system of claim 1, wherein the controller is configured to: compute the generated heat amount over the time period with the time period selected to maintain an approximately continuous temperature of the RESS at a selected level where operational efficiency is maximized.

3. The system of claim 1, wherein the controller includes a PID module configured to issue a command when the coolant temperature, as communicated through a feedback loop diverges from a setpoint, and a feedforward module configured to monitor heat generation in the RESS to predict an impact on the coolant temperature, prior to the impact being registered through the feedback loop.

4. The system of claim 1, wherein the controller is configured to:
   control the coolant to a setpoint temperature; and
   initiate cooling of the RESS based on the generated heat amount and before the coolant reaches the setpoint.

5. The system of claim 1, wherein the cooling system comprises:
   a fluid circuit that includes a coolant loop through which the coolant is circulated;
   a refrigerant circuit configured to circulate a refrigerant; and
   a heat exchanger through which both the coolant and refrigerant are circulated.

6. The system of claim 1, wherein the controller is configured to compute the generated heat amount using current, ohmic resistance, charge transfer resistances and diffusion resistance of the RESS.

7. The system of claim 1, wherein the controller is configured to compute the generated heat amount based on ohmic losses, anode and cathode interface losses and diffusion losses, of the RESS.

8. The system of claim 7, wherein the controller is configured to compute the generated heat amount using: generated heat amount=$I^2 R_{ohm}+V_{d l1}^2/R_{ct1}+V_{dl2}^2+/R_{ct2}+IV_{diff}$, where,
   I is current through the RESS;
   $R_{ohm}$ is ohmic resistance of the RESS;

$V_{dl1}$ is double layer voltage of an anode interface of the RESS;

$V_{dl2}$ is double layer voltage of a cathode interface of the RESS;

$R_{ct1}$ is charge transfer resistance of the anode interface;

$R_{ct2}$ is charge transfer resistance of the cathode interface; and $V_{diff}$ is diffusion voltage of the RESS.

9. The system of claim 1, wherein the controller is configured to compute a temperature difference (dT) of the coolant, wherein the dT is an amount determined to remove the generated heat amount from the RESS.

10. The system of claim 9, wherein the temperature difference is computed using: $dT=Q/mC_p$, where, Q is a total generated heat amount produced by the RESS over the time period; m is a mass flow rate of the coolant; and $C_p$ is a value representing thermal capacity of the coolant.

11. A method of thermal conditioning a rechargeable energy storage system (RESS), the method comprising:
circulating, by a cooling system, a coolant to cool the RESS;
calculating, by a controller and over a time period, a generated heat amount of the RESS;
calculating, by the controller, a target temperature of the coolant based on the generated heat amount, the target temperature targeted to remove the generated heat amount from the RESS over a next period of time, the next period of time approximately equal to the time period in duration, and the next period of time following the time period in sequence; and
operating, by the controller, actuators of the thermal conditioning system to set the coolant at the target temperature to remove the generated heat amount from the RESS over the next period of time.

12. The method of claim 11 comprising calculating, by the controller, the generated heat amount using: generated heat amount=$I^2R_{ohm}+V_{dl1}^2/R_{ct1}+V_{dl2}^2/R_{ct2}+IV_{diff}$, where, I is current through the RESS;

$R_{ohm}$ is ohmic resistance of the RESS;

$V_{dl1}$ is double layer voltage of an anode interface of the RESS;

$V_{dl2}$ is double layer voltage of a cathode interface of the RESS;

$R_{ct1}$ is charge transfer resistance of the anode interface;

$R_{ct2}$ is charge transfer resistance of the cathode interface; and $V_{diff}$ is diffusion voltage of the RESS.

13. The method of claim 11, comprising:
selecting the time period to maintain an approximately continuous temperature of the RESS at a selected level where operational efficiency is maximized.

14. The method of claim 11, comprising:
reading, by the controller through a feedback loop, the coolant temperature;
issuing, by the controller using a PID module, a command to cool the coolant when the coolant temperature diverges from a setpoint; and
monitoring, by the controller using a feedforward module, heat generation in the RESS to predict an impact on the coolant temperature, prior to the impact being registered through the feedback loop.

15. The method of claim 11, comprising:
controlling the coolant to a setpoint temperature; and
initiating cooling of the RESS based on the generated heat amount and before the coolant reaches the setpoint.

16. The method of claim 11, wherein the generated heat amount comprises ohmic losses, anode interface losses, cathode interface losses, and voltage diffusion losses of the RESS.

17. The method of claim 11, comprising calculating, by the controller, the generated heat amount using current, ohmic resistance, charge transfer resistances and diffusion resistance inputs from the RESS.

18. The method of claim 11, comprising calculating, by the controller, a temperature difference (dT) of the coolant, wherein the dT is an amount determined, by the controller, to remove the generated heat amount from the RESS.

19. The method of claim 18, wherein calculating the temperature difference comprises solving $dT=Q/mC_p$, where, Q is a total generated heat amount produced by the RESS; m is a mass flow rate of the coolant; and $C_p$ is a value representing thermal capacity of the coolant.

20. A vehicle comprising:
an electric powertrain;
a rechargeable energy storage system (RESS) coupled with the electric powertrain;
a thermal conditioning system including a fluid circuit that includes a coolant loop configured to circulate a coolant, including through the RESS, and including a refrigerant circuit configured to circulate a refrigerant;
a heat exchanger through which both the coolant and refrigerant are circulated; and
a controller coupled with the cooling system and configured to:
compute a generated heat amount of the RESS;
sum the computed generated heat amount over a time t;
compute the target temperature of the coolant to remove the generated heat amount from the coolant during a next time that is equal to the time t; and
operate actuators of the thermal conditioning system to cool the coolant through the heat exchanger to the target temperature over the time t,
wherein the controller includes a PID module configured to issue a command when the coolant temperature, as communicated through a feedback loop diverges from a setpoint, and a feedforward module configured to monitor heat generation in the RESS to predict an impact on the coolant temperature, prior to the impact being registered through the feedback loop.

* * * * *